United States Patent Office 3,403,078
Patented Sept. 24, 1968

3,403,078
PROCESS FOR THE PRODUCTION OF NOTOMYCIN A₁
Charles A. Claridge, Manlius, and Alexander Gourevitch, De Witt, N.Y., assignors to Bristol-Myers Company, New York, N.Y., a corporation of Delaware
No Drawing. Filed May 11, 1964, Ser. No. 366,629
3 Claims. (Cl. 195—114)

ABSTRACT OF THE DISCLOSURE

In the process of fermenting a strain of Streptomyces, e.g., *S. rishiriensis*, which normally produces an antibiotic mixture containing substantial amounts of both notomycin $A_1$ and notomycin $A_2$ (also called coumermycin $A_1$ and coumermycin $A_2$, see U.S. Patent 3,201,386) the production of notomycin $A_2$ is suppressed in favor of notomycin $A_1$ by the addition to the fermentation medium of at least 0.02, and less than 400, parts per million parts of medium of a nontoxic source of ionic cobalt before, at or near the beginning of the period of fermentation.

---

This invention relates to a process for the production of the antibiotic notomycin $A_1$ by fermentation and, more particularly, to the use of cobalt salts in notomycin fermentations to increase the amounts of notomycin $A_1$ formed and at the same time reduce the amount of notomycin $A_2$ formed.

Notomycin is an antibiotic effective against infections caused by Gram-positive organisms. It is prepared by the process which comprises cultivating a strain of *Streptomyces rishiriensis* in an aqueous carbohydrate solution containing a nitrogenous nutrient under submerged aerobic conditions until substantial activity versus Gram-positive bacteria is imparted to said solution and then recovering said notomycin from said solution.

The organism producing the antibiotic of the present invention was isolated from a sample of soil collected in Rishiri Island, Hokkaido, Japan and is a new species, designated *Streptomyces rishiriensis* of the genus Streptomyces. A culture of the living organism, given the laboratory designations 404Y3 and A9795 has been deposited in the American Type Culture Collection, Washington, D.C. and added to its permanent collection of microorganisms as A.T.C.C. 14812.

Notomycin, which has also been called antibiotic Bu-620, is a complex or mixture of five antibacterial compounds which have been given the individual names of notomycin $A_1$, notomycin $A_2$, notomycin B, notomycin C and notomycin D. The most important members of the notomycin complex are notomycin $A_1$ and notomycin $A_2$ which have the formula practical on a commercial scale because it is accompanied by a roughly equal amount of notomycin $A_2$ from which it cannot be separated by any process of a commercial nature.

It was the object of the present invention to provide a process for the production of notomycin by fermentation which yields in the beer a very large preponderance of notomycin $A_1$ which can then be isolated in pure form free of notomycin $A_2$ by ordinary procedures of extraction and crystallization.

This objective has been achieved by the provision, according to the present invention, in the process for the production of notomycin $A_1$ by submerged aerobic fermentation of a notomycin-producing microorganism of the genus Streptomyces, of the step which comprises adding a source of ionic cobalt early in the fermentation to produce at harvest a broth containing a major amount of notomycin $A_1$ and a minor to negligible amount of notomycin $A_2$.

A preferred embodiment of the present invention comprises, in the process for the production of notomycin $A_1$ by submerged aerobic fermentation of *Streptomyces rishiriensis*, the step which comprises adding a source of ionic cobalt in an amount in the range of about 0.02 to about 200 parts per million parts of medium early in the fermentation to produce at harvest a broth containing a major amount of notomycin $A_1$ and a minor to negligible amount of notomycin $A_2$.

Thus, a highly efficient method of causing this fermentation to produce notomycin $A_1$ to the virtual exclusion of notomycin $A_2$, i.e. so that there is formed less than one or two percent of the latter, is the procedure of adding a salt, preferably water-soluble, of cobalt to the medium at or near the beginning of the fermentation. A typically useful salt is $CoCl_2$ but any other salt of cobalt can be used which is not poisonous to the organism as determined by simple test, i.e. is nontoxic. Amounts of 0.0004, 0.0008, 0.004, 0.0016, 0.0012 and 0.020% have been found to be highly effective. In addition, addition of $CoCl_2 \cdot 6H_2O$ in amounts as low as 20 micrograms per liter of medium have been found to produce the same remarkable increase in the ratio of notomycin $A_1$ to notomycin $A_2$ as has also the addition of vitamin $B_{12}$ at 4000 mcg./l. and the addition of nickel salts containing small amounts of cobalt as an impurity. It is apparent that any source of cobalt may be used as long as it is not a poison to the microorganism. Such sources include those not widely known to contain cobalt, e.g. certain types of linseed oil containing cobalt added to increase its rate of drying when used in a paint. The preferred sources of ionic cobalt to be used in the present invention are the cobaltous and cobaltic salts or organic and inorganic acids such as chlorides, sulfates, acetates and

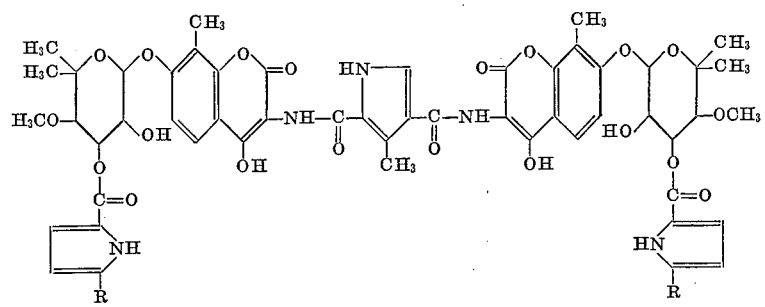

wherein both R groups represent methyl in the case of notomycin $A_1$ and represent hydrogen in notomycin $A_2$.

Of these components of the notomycin complex, the one of greatest interest as an antibacterial agent is notomycin $A_1$. Its production in pure form has been imthe like. The addition of the source of cobalt ions is made before, at or near the beginning of the period of fermentation, i.e. early in the fermentation. The preferred amount of cobalt source to be used is in the range of about 0.02 p.p.m. to about 200 p.p.m.

Use may be made of any of the media used for ordinary notomycin fermentations. Typical broths of the present invention contain 500–1000 mcg./ml. of notomycin $A_1$ and contain zero, less than one or less than two percent notomycin $A_2$ by analysis.

Mixtures of notomycins $A_1$ and $A_2$ free of other components are easily obtained by the procedures set forth below. The identity and amount of each of notomycin $A_1$ and notomycin $A_2$ in such mixtures is determined by the use of gas chromatography. In this procedure a mixture of notomycins $A_1$ and $A_2$ (10 mgm.) is suspended in dry reagent grade methanol (200 microliters) in a 5 mm. glass tube having one end sealed. To this suspension is added 2.5 M sodium methoxide in methanol (17 microliters). The solids dissolve. The tube is chilled in a solid $CO_2$-acetone bath, sealed, placed in a 60° C. bath for 15 minutes, removed and opened. Of the reaction mixture therein, 10 microliters are chromatographed on an 8 foot by ¼ inch copper column containing 13.5 grams of five percent by weight of (Craig) polyester succinate (supplied by Wilkins Instrument and Research Inc.) on dichlorodimethylsilane-treated diatomaceous earth ("Gas-Crom Z" supplied by Applied Science Laboratories Inc., State College, Pa.). The instrument is a gas chromatograph supplied by F & M Scientific Corp., Avondale, Pa. The bridge power is 200 milliamperes, the attenuation is 2×, the starting column temperature is 100° C., the heating rate is 4° C. per minute, the detector block temperature is 260° C., the injection port is 280° C. and the gas (helium) flow from the column is 60 ml./minute and from the detector is 20 ml./min. Under these conditions the methyl esters of pyrrole-2-carboxylic acid (from notomycin $A_2$) and 5-methyl-pyrrole-2-carboxylic acid from notomycin $A_1$ have retention times of 12 and 15 minutes respectively. The detector measures thermal conductivity versus helium alone and when recorded is used to make a quantitative determination of the amounts present of the two methyl esters and thus of the amounts of notomycins $A_1$ and $A_2$ in the original mixture.

The following examples will serve to illustrate the present invention without limiting it thereto.

EXAMPLE 1.—Notomycin $A_1$

*Streptomyces rishiriensis* (six gallons of inoculum) was fermented with agitation beginning at the twentieth hour (two sets of impellers at 155 r.p.m.) and with aeration at 75 cubic feet per minute at 81° F. for 190 hours in 800 gallons of a medium sterilized thirty minutes at 250° F. containing the following ingredients: 7.0% starch ("Staclipse J"), 2.0% cottonseed endosperm flour ("Pharmamedia"), 1.0% debittered yeast, 0.4%

$(NH_4)_2SO_4$ 1.0% raw linseed oil (containing cobalt salts), 0.5% $CaCO_3$, 0.25 $K_2HPO_4$, 2.0% lard oil and 0.5% of a water-soluble condensation product, having a total molecular weight of about 1900–2000, of ethylene oxide with a water-insoluble, hydrophobic polyoxypropylene chain formed by condensing propylene oxide with propylene glycol, said hydrophobic chain having a molecular weight of about 1750 and constituting about 90% by weight of said water-soluble condensation product ("Pluronic L61"). The pH was initially 6.8, fell to 5.3 at 40 hours and then rose gradually to a final value of 6.4.

From this fermentation 2650 l. whole broth was adjusted to pH 6 with sulfuric acid and extracted with an equal volume of methyl isobutyl ketone (MIBK) by two-stage counter-current extraction. The MIBK was concentrated to one-tenth volume by vacuum distillation to precipitate the crude antibiotic. As it was contaminated with linseed oil, it was slurried several times in MIBK and in methanol. The product (367.3 g.) was then recrystallized in the acid form by slurrying it in a mixture of two parts water and eight parts acetone in which it was then dissolved by the addition of $NH_4OH$ to pH 10. After carbon decolorization the pH was lowered to 6 to precipitate the purified product, notomycin $A_1$, as the acid (303.3 g.).

The acid was then converted to the monosodium salt. Thus, 300 g. acid was dissolved in 1500 ml. dimethylformamide and filtered. To the filtrate there was added 100 ml. of a 42% by weight solution of sodium 2-ethylhexanoate in dry n-butanol and then 8500 ml. dry n-butanol. Notomycin $A_1$ spontaneously crystallized as the monosodium salt and was collected by filtration and found to weigh 272.5 g. and to be over 99% pure as determined by vapor phase chromatography. This material was then converted to the free acid, recrystallized from aqueous methyl ethyl ketone and from methanol-methylene chloride and reconverted by the above procedure to the monosodium salt which was recrystallized from ethanol-tetrahydrofuran to give 187 g. pure notomycin $A_1$. When pelleted in potassium bromide this sample of notomycin $A_1$ exhibited infrared absorption maxima at the following wave numbers in reciprocal centimeters: 3380, 2990, 2940, 1685, 1640, 1605, 1530, 1495, 1430, 1400–1380, 1320, 1265, 1225, 1140 (shoulder), 1120, 1090, 1045, 1000, 975, 890, 820, 795 and 770. The maxima at 1495 and 1225 cm.$^{-1}$ are exhibited by notomycin $A_1$ but not by notomycin $A_2$.

The antibacterial spectrum of the sample of notomycin $A_1$ prepared above was tested by the tube dilution technique to determine the minimum concentrations (MIC) of the antibiotic completely inhibiting growth of bacteria for 24 hours. The following results were obtained:

|  | MIC in mcg./ml. | | |
| --- | --- | --- | --- |
|  | Medium* | 1st run | 2nd run |
| *Bacillus subtilis* | HIB | 6.3 | 12.5 |
| *Escherichia coli* | HIB | 12.5 | 12.5 |
| *Alebsiella pneumoniae* | HIB | 6.3 | 6.3 |
| *Proteus morganii* | HIB | 6.2 | 6.3 |
| *Proteus vulgaris* | HIB | 3.1 | 3.1 |
| *Pseudomonas aeruginosa* 8602/A | HIB | 12.5 | 25 |
| *Pseudomonas aeruginosa* (Yale) | HIB | 25 | 25 |
| *Salmonella enteritidis* | HIB | 25 | 25 |
| *Salmonella typhosa* | HIB | 12.5 | 25 |
| *Staphylococcus aureus* (Smith) | HIB | 12.5 | 12.5 |
| *Staphylococcus aureus* (Smith) | HIB | 0.004 | 0.002 |
| *Staphylococcus aureus* (Smith) | HIB+S | 1.6 | 6.3 |
| *Streptococcus pyogenes* | HIB | 0.062 | 0.062 |
| *Proteus vulgaris* No. 329 | HIB |  | 12.5 |

*HIB—Difco Heart Infusion broth. HIB+S—Same mixed 1:1 with pooled human serum.

Notomycin $A_1$ has the structural formula:

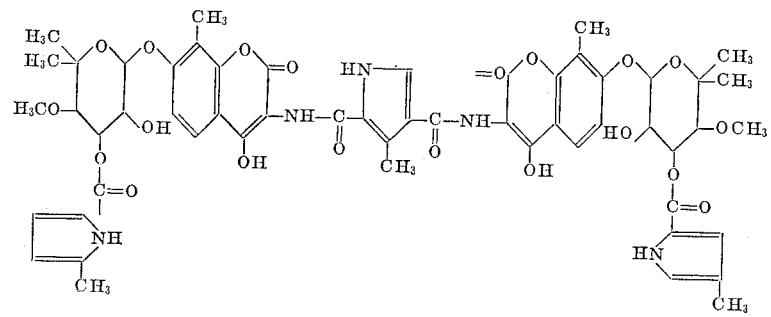

EXAMPLE 2

Five additional fermentations were conducted using the medium of Example 1 except that the linseed oil was replaced by the tabulated amount of $CoCl_2$. Weighed samples of broth at harvest were analyzed to give results as follows:

| Added $CoCl_2$ in Percent | Broth Assays | |
|---|---|---|
| | Mcg. Notomycin $A_1$ per gram Broth | Percent Notomycin $A_1$ |
| 0.0004 | 840–990 | >98 |
| 0.0008 | 510–580 | >99 |
| 0.0008 | 500–660 | 100 |
| 0.0008 | 500–880 | 100 |
| 0.0016 | 830–980 | >98 |

Four additional fermentations using the medium of Example 1 except that neither the linseed oil nor any added cobalt salt was used gave solid products shown by analysis to contain 48, 39, 41 and 49% notomycin $A_1$ respectively with the remainder being primarily notomycin $A_2$.

EXAMPLE 3

*Streptomyces rishiriensis* was fermented for 8 days in shake flasks at 28° C. using two media. One medium consisted of 5% corn syrup, 2% cottonseed endosperm flour ("Pharmamedia"), 2% soybean meal, 1% debittered yeast, 0.1% $(NH_4)_2SO_4$ and 0.5% $CaCO_3$. The other medium consisted of 4% starch ("Staclipse J"), 4% lard oil, 2.5% cottonseed endosperm flour, 2% debittered yeast, 0.1% $K_2HPO_4$ and 0.1% $CaCO_3$. In multiple runs there was added to these media cobaltous chloride in the amounts of 0% (control), 0.004%, 0.012%, 0.020%, (i.e. 200 p.p.m.) and 0.040%. The flasks containing 0.040% $CoCl_2$ showed little or no antibacterial activity but all the other broths were potent and of a potency about equal to their companion runs. Differential analysis for notomycin $A_1$ and notomycin $A_2$ showed the percentage notomycin $A_1$ to be about 40–50% in the controls (zero percent $CoCl_2$) and to be sharply increased in the runs using 0.004%, 0.012% and 0.020% $CoCl_2$ to figures usually in the range of 70% to >95%.

EXAMPLE 4

Additional similar experiments demonstrated that the amounts of notomycin $A_1$ were markedly increased and the amounts of notomycin $A_2$ was reduced virtually to zero by the addition of $CoCl_2 \cdot 6H_2O$ in amounts as low as 20 micrograms per liter of medium, i.e. 0.02 p.p.m., and by the addition of 4000 mcg./l. vitamin $B_{12}$, which contains about 4% cobalt.

The same effect was *not* obtained by the use of salts of $Al^{+++}$, $Fe^{+++}$, $Fe^{++}$, $Zn^{++}$, $Mn^{++}$ and $Cr^{+++}$. The desired increase in the notomycin $A_1$ to $A_2$ ratio *was* obtained with nickel salts but in that case the result was attributed to the 0.4% of cobalt present as an impurity in the nickel salt used. Naturally, corresponding larger amounts of the cobalt sources are used as their content of cobalt decreases.

General information on the production of the notomycin complex by fermentation which does not form part of the present invention is given in the following paragraphs.

The representative strain, No. 404Y3 of *S. rishiriensis* has the following characteristics:

CULTURAL CHARACTERISTICS

| G = Growth | S = Soluble pigment |
|---|---|
| A = Aerial mycelium | B = Biochemical property |

| | |
|---|---|
| 1. Czapek's agar | G: Moderate, yellowish gray to light brownish gray or ivory yellow.<br>A: Poor, powdery, white.<br>S: None. |

CULTURAL CHARACTERISTICS—Continued

| G = Growth | S = Soluble pigment |
|---|---|
| A = Aerial mycelium | B = Biochemical property |

| | |
|---|---|
| 2. Glycerol Czapek's agar | G: Moderate, yellowish gray or light brownish gray to pale yellow with faint brown.<br>A: Poor, powdery, white.<br>S: None or pale yellow with faint brown. |
| 3. Glycerol ammonium salt agar. | G: Moderate, light yellowish gray to yellowish white.<br>A: Scant, powdery, light yellowish gray to light gray.<br>S: None. |
| 4. Glucose asparagine agar | G: Poor, thin, glossy, light yellowish gray.<br>A: None.<br>S: None. |
| 5. Starch agar | G: Good, light yellowish gray to ivory yellow.<br>A: Moderate, powdery, spreading, faint brown to pale brown with gray.<br>S: None.<br>B: Hydrolysis is moderately strong. |
| 6. Nutrient agar | G: Moderate, burnt umber to brown.<br>A: Poor, powdery, white.<br>S: Dark brown. |
| 7. Bennett's agar | G: Moderate, grayish olive brown to grayish brown.<br>A: Moderate, white to pale brown to brownish gray.<br>S: Yellow brown. |
| 8. Oatmeal soyton agar | G: Good, pale yellow with faint brown.<br>A: Moderate, white to gray with faint brown.<br>S: Pale yellow with faint brown. |
| 9. Potato plug | G: Good, glossy, wrinkled surface.<br>A: None.<br>S: Plug changed brownish black. |
| 10. Gelatin stab | G: Brownish black colony on the surface.<br>A: None.<br>S: Dark brown.<br>B: Negative liquefaction. |
| 11. Tyrosine yeast gelatin stab | G: Brownish black colony on the surface.<br>A: None.<br>S: Dark brown.<br>B: Negative liquefaction. |
| 12. Milk | G: Brownish ring formation.<br>A: None.<br>S: Faint brown.<br>B: Not digested. |
| 13. Nitrate solution | G: White pellet mass on the surface.<br>B: Positive reduction to nitrite. |
| 14. Melanin formation media | G: Poor, thin, grayish black.<br>A: Scant, white.<br>S: Brownish gray to grayish brown.<br>B: Melanin positive. |
| 15. Potato dextrose agar | G: Good, glossy, brownish black.<br>A: Moderate, white to pale pink to pale. Brown with faint gray.<br>S: Gray or warm gray. |

UTILIZATION OF CARBON SOURCES

| | | | |
|---|---|---|---|
| Xylose | ++ | Inulin | ++ |
| Arabinose | ++ | Salicin | ++ |
| Glucose | ++ | Mannitol | − |
| Galactose | ++ | Sorbitol | ± |
| Fructose | ++ | Cellobiose | + |
| Sorbose | − | Rhamnose | ++ |
| Sucrose | ++ | Sodium citrate | + |
| Maltose | ++ | Sodium succinate | + |
| Lactose | ++ | Inositol | ++ |
| Raffinose | ++ | Control | − |

++ = Good growth.
+ = Fair growth.
± = Doubtful growth.
− = No growth.

Mycological characteristics

The morphological properties of the strain were observed on starch agar and Bennett's agar. Microscopic examination of the aerial mycelium revealed tangled and branched hyphae, occasionally tuft, and sporophores which produced sinistrorse spirals. On electron microscopic observation, the shape of spores was found to be elliptical to oval and the surface was smooth.

Streptomyces 404Y3 has a brownish gray aerial mycelium and produces brown or dark brown pigment on organic media. Gelatin liquefaction is negative both in gelatin stab and tyrosine yeast gelatin stab and milk is not digested. Nitrite is produced from nitrate and starch is hydrolyzed. Strain 404Y3 resembles *S. diastatochromogenes, S. griseoruber, S. olivochromogenes, S. aureus, S. griseochromogenes, S. hawaiiensis* and *S. naganishi* in some respects such as spiral formation, color of aerial mycelium and melanoid pigment, but differs in certain cultural and physiological properties as shown below:

*S. diastotochromogenes.*—According to Waksman and Curtis, sporophores are straight, and according to Jensen, sinistrorse spirals are produced. The color of aerial mycelium is reported to be white to ash gray on Czapek's and gray on glucose asparagine agar. Liquefaction on gelatin stab is fairly rapid.

*S. griseoruber.*—The shape of spore is reported to be cylindrical. The color of growth is reddish orange on Czapek's and light reddish orange to reddish purple on starch agar. Differences are also found on utilization of carbon sources such as sucrose, raffinose, citrate and succinate.

*S. olivochromogenes.*—Differences are found in growth color, soluble pigment on glucose asparagine agar and digestion of gelatin and milk.

*S. aureus.*—The color of growth is dark brown on Czapek's and light orange on glucose asparagine agar. Gelatin liquefaction is rapid, later slowing down.

*S. griseochromogenes.*—The color of aerial mycelium is white to light neutral gray. Gelatin liquefaction is moderate. Milk is peptonized without coagulation. Differences are also found in utilization of carbon sources such as rhamnose, inulin, salicin, citrate and succinate.

*S. hawaiiensis.*—The growth color on glucose asparagine agar is light brown and aerial mycelium is white to gray. Differences are also found in utilization of carbon sources such as sorbitol and succinate.

*S. naganishi.*—The growth color on starch agar is cream with reddish purple and soluble pigment on starch agar is faint pink. Gelatin is moderately liquefied. Milk is coagulated and peptonized. Differences are observed in utilization of carbon sources such as sucrose and sorbitol.

In order to select strains of high productivity, ultraviolet irradiation was done on the original strain and mutant colonies were selected. Some of the higher producers among these strains were investigated mycologically, but notable differences were not observed except for obtaining a few strains of white aerial mycelium.

In view of the above characteristics of the strain, Streptomyces 404Y3 was determined to be a new species and designated *Streptomyces rishiriensis* nov. sp.

The species *Streptomyces rishiriensis* described herein includes all strains of streptomyces which form notomycin and which cannot be definitely differentiated from the strain No. 404Y3 and its subcultures including mutants and variants. The properties of notomycin are described herein and, after these properties are known, it is easy to differentiate the strains producing notomycin from others.

*Streptomyces rishiriensis* when grown under suitable conditions, produces notomycin. A fermentation broth containing notomycin is prepared by inoculating spores or mycelia of the notomycin-producing organisms into a suitable medium and then cultivating under aerobic conditions. For the production of notomycin, cultivation on a solid medium is possible, but for production in a large quantity cultivation in a liquid medium is preferable. The temperature of the cultivation may be varied over a wide range, 20–35° C., within which the organism may grow but a temperature of 26–30° C. and a substantially neutral pH is preferred. In the submerged aerobic fermentation of the organism for the production of notomycin, the medium contains as the source of carbon a commercially available glyceride oil or a carbohydrate such as glycerol, glucose, maltose, sucrose, lactose, dextrin, starch, etc. in pure or crude states, and as the source of nitrogen an organic material such as soybean meal, distillers' solubles, peanut meal, cottonseed meal, meat extract, peptone, fish meal, yeast extract, corn steep liquor, etc., and, when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325 and in United States Patents 2,691,618; 2,658,018; 2,653,899; 2,586,762; 2,516,080; 2,483,892; 2,609,329 and 2,709,672. In aerated submerged culture an antifoam such as liquid paraffin, fatty oils or silicone is used. More than one kind of carbon source, nitrogen source or antifoam may be used for the production of notomycin. Generally, the cultivation is continued until at least several hundred mcg./ml. of notomycin has accumulated in the medium. In some cases the broth pH decreased at the beginning and then gradually rose.

One preferred method of isolating notomycin from a fermentation broth comprises extracting whole broth at pH 6.0 with one-half volume of methyl isobutyl ketone, back extracting at pH 10.0 into water (one-quarter the volume of the methyl isobutyl ketone phase) and re-extracting at pH 6.0 into ethyl acetate or methyl isobutyl ketone (one-third the volume of the last aqueous phase). The final concentrated solution of notomycin in the organic solvent is then concentrated to one-tenth or one-twentieth its original volume by distillation in vacuo. Notomycin is then precipitated, if it does not precipitate spontaneously, by the addition of mixed lower alkanes, e.g. by the addition of ten volumes of "Skellysolve B."

Notomycin is also easily recovered from filtered broths by absorption on activated carbon (Darco KB) and subsequent elution therefrom but this process is not superior to solvent extraction of whole broth as in many broths most of the notomycin is in the mycelium.

Notomycin is a useful agent for the treatment of mastitis in cattle or calf scours; for this purpose use is made, for example, of suspensions in vegetable oil for instillation in the teats to treat mastitis, containing 1 to 1000 mgm./ml., and preferably about 50 mgm., of the antibiotic, or enough capsules to provide a total dosage of 0.25 to 2.0 grams by oral administration as for calf scours.

Notomycin, notomycin $A_1$ and notomycin $A_2$ are each useful agents for the detection of contamination by Gram-negative bacteria, fungi, yeasts and the like in the course of the commercial production of the enzymes Streptokinase and Streptodornase by the growth of Streptococci and the production of amylase by fermentation of *B. subtilis* or *B. cereus*. Thus, the addition of 1 to 1000 mcg./ml. and preferably about 10 mcg./ml., of the antibiotic to an aliquot of inoculated medium followed by incubation, permits the growth of undesirable contaminants and their visual detection.

Physico-chemical properties of notomycin $A_1$

Notomycin $A_1$ is a white acidic antibiotic, readily soluble in alkaline water, dioxane, tetrahydrofuran and dimethylformamide, moderately soluble in acetone, methyl isobutyl ketone, methyl ethyl ketone and ethyl acetate, less soluble in butanol, ethanol, methanol, chloroform and benzene, and insoluble in carbon tetrachloride, petroleum ether and acidic water. Mono- and disodium salts of the antibiotic are more soluble in ethanol than the free acid.

The free acid of notomycin $A_1$ turns brown at 240–245° C. and decomposes at 258–260° C. It analyzes well for $C_{55}H_{59}N_5O_{20}$. Calculated: C, 59.51; H, 5.36; N, 6.31. Found: C, 60.15, 59.98; H, 5.59, 5.49; N, 6.10, 6.22. The molecular weight was determined osmometrically to be approximately 1100 compared to the theoretical value of 1110.1. Titration equivalent was found to be 566 in 75% aqueous dioxane solution with a $pK_a'$ of 7.76.

The crystalline monosidium salt of notomycin $A_1$ decomposes at 245° C. with gas evolution. Analysis calculated for $C_{55}H_{58}N_5O_{20}Na$: C, 58.35; H, 5.16; N, 6.19; Na, 2.03. Found: C, 58.03; H, 5.26; N, 6.18. The sodium content was found to be 1.99% by flame spectrophotometric assay. The monosodium salt was titrated both by 0.1 N NaOH and 0.1 N HCl with an equivalent weight of 1121 by NaOH and 1182 by HCl. Notomycin $A_1$ is levorotatory: $[\alpha]_D^{25} = -141.1°$ (c. 1, 75% aqueous acetone).

In the ultraviolet absorption spectra of monosodium notomycin $A_1$ absorption maxima are observed at the following wave lengths:

In ethanol 214 m$\mu$ ($E_{1cm}^{1\%} = 670$), 273 m$\mu$ ($E_{1cm}^{1\%} = 485$), 330 m$\mu$ ($E_{1cm}^{1\%} = 362$)

In acidic ethanol[1]

274 m$\mu$ ($E_{1cm}^{1\%} = 432$), 344 m$\mu$ ($E_{1cm}^{1\%} = 500$)

In alkaline ethanol[2]

213 m$\mu$ ($E_{1cm}^{1\%} = 861$), 237 m$\mu$ ($E_{1cm}^{1\%} = 510$), 283 m$\mu$ ($E_{1cm}^{1\%} = 576$)

[1] 95% ethanol containing N/100 HCl.
[2] 95% ethanol containing N/100 NaOH.

Notomycin $A_1$ gave a positive reaction with Fehling, Molisch and Ehrlich reagents and decolorized bromine in acetic acid. Tollens reagent gave a silver mirror after about eight hours, and anthrone gave a brown color. The ninhydrin reaction was negative. The following $Rf$ values were obtained with monosodium notomycin $A_1$ by ascending paper strip chromatography: butanol, 0.30; aqueous 3% ammonium chloride, 0.03; 50% acetone, 0.69; butanol-methanol-water (4:1:2), 0.25; benzene-methanol (4:1), 0.16; water, 0.06. One solvent system was used to separate other closely related antibiotic fractions formed during the fermentation and isolation studies. This descending system consists of two parts of acetone and three parts of 0.1 molar triethanolamine adjusted to pH 7 with glacial acetic acid.

In vitro microbiological studies.—Antibacterial spectrum

The minimum inhibitory concentration (MIC) of notomycin $A_1$ against a variety of microorganisms was determined by the serial two-fold dilution method. Crystalline monosodium salt of notomycin $A_1$ was sterilized by dissolving it in 80% aqueous ethanol at a concentration of 2000 mcg./ml. and serial dilutions were made by sterile water in a set of sterile test tubes. From each tube 0.5 ml. was taken and mixed with 9.5 ml. of the respective test medium, the pH of the media being adjusted to 7.0. Mostly, nutrient agar was employed as the test medium, however 10% horse blood agar was used for hemolytic streptococci and pneumococci, glucose-yeast-peptone agar for lactobacilli, 2% glucose-Sabouraud agar for fungi and Kirchner's broth for tubercle bacilli. The results are tabulated along with those obtained with novobiocin which was used as a reference:

ANTIBACTERIAL SPECTRUM OF NOTOMYCIN $A_1$

| Test Organism | Test Media* | MIC mcg./ml. Notomycin $A_1$ | MIC mcg./ml. Novobiocin | Ratio NB/NM |
|---|---|---|---|---|
| Gram-negative: | | | | |
| E. coli NIHJ | A | 6.25 | 12.5 | 2 |
| E. coli PO 1495 | A | 12.5 | 100 | 8 |
| E. coli PO 1495 (CP,TC-R) | A | 6.25 | >100 | |
| E. coli ATCC 9637 | A | 6.25 | 50.0 | 8 |
| K. pneumoniae Type A | A | 0.78 | 3.12 | 4 |
| Salmonella typhi | A | 6.25 | 6.25 | 1 |
| Salmonella paratyphi A | A | 1.56 | 1.56 | 1 |
| Shigella dysenteriae A | A | 6.25 | 25.0 | 4 |
| Shigella flexneri | A | 6.25 | 3.12 | 0.5 |
| Shigella sonnei | A | 1.56 | 50.0 | 32 |
| B. brochiseptica ATCC 4617 | A | 12.5 | >100 | |
| Neisseria sp. (CP-R) | A | 12.5 | 12.5 | 1 |
| Pseudomonas aeruginosa | A | 12.5 | 100 | 8 |
| Gram-positive: | | | | |
| Staph. aureus FDA 209-P | A | 0.0012 | 0.039 | 32 |
| Staph. aureus FDA 209-P (ST, SM-R) | A | 0.0012 | 0.019 | 16 |
| Staph. aureus FDA 209-P (NB-R) | A | 0.156 | 5.0 | 32 |
| Staph. aureus 52-34 (PC,TC, EM,CM-R) | A | 0.0012 | 0.078 | ⅔ |
| Staph. aureus 193 (PC,TC,EM,CM-R) | A | 0.0006 | 0.039 | 64 |
| Staph. aureus 193 (PC,TC-R) | A | 0.0012 | 0.039 | 32 |
| Staph. aureus Smith strain | A | 0.0012 | 0.039 | 32 |

| Test Organism | Test Media* | MIC mcg./ml. Notomycin $A_1$ | MIC mcg./ml. Novobiocin | Ratio NB/NM |
|---|---|---|---|---|
| Staph. albus | A | 0.0025 | 0.019 | 8 |
| Micrococcus flavus | A | 0.0025 | 0.039 | 16 |
| Sarcina lutea PCI 1001 | A | 0.005 | 0.078 | 16 |
| Corynebacterium xerosis 53-K-1 | A | 0.0006 | 0.0012 | 2 |
| Bacillus subtilis PCI 219 | A | 0.312 | 0.312 | 1 |
| Bacillus sphericus 122 | A | 0.156 | 0.156 | 1 |
| Bacillus mycoides strain "O" | A | 0.078 | 0.312 | 4 |
| Bacillus cereus ATCC 10702 | A | 0.156 | 0.625 | 4 |
| Bacillus anthracis 115 | A | 0.156 | 0.156 | 1 |
| Streptococcus pyogenes Type 3 | B | 0.78 | 0.78 | 1 |
| Diplococcus pneumoniae Type II | B | 0.78 | 0.78 | 1 |
| Diplococcus pneumoniae DP-3-5A | B | 0.78 | 6.25 | 8 |
| L. casei ATCC 7469 | C | >10 | 0.039 | |
| L. acidophillus B-406-1 | C | >10 | 0.078 | |
| Acid-fast: | | | | |
| Mycobacterium tuberculosis var hominis H37Rv | D | 0.78 | 12.5 | 16 |
| Mycobacterium 607 | D | 12.5 | 25 | 2 |
| Mycobacterium phlei | D | 1.56 | 6.25 | 4 |
| Fungi: | | | | |
| Aspergillus niger var Tieghen | E | >100 | >100 | |
| Penicillium chrysogenum | E | >100 | >100 | |
| Candida albicans | E | >100 | >100 | |
| Saccharomyces cereviciae ATCC 9763 | E | >100 | >100 | |

*A = nutrient agar.
B = nutrient agar containing 10% horse blood.
C = glucose 1.0%, dry yeast extract 0.5%, polypeptone 0.5% sodium acetate 1.0%, agar 1.5%, pH 7.4.
D = Kirchner's broth (MIC after 10 days).
E = Sabouraud agar containing 2% glucose.

Abbreviations:
-R = resistant    PC = penicillin
CM = carbomycin    SM = Streptomycin
CP = chloramphenicol    ST = streptothricin
EM = erythromycin    TC = tetracycline
NB = novobiocin Notomycin $A_1$ inhibits the growth of Gram-positive, Gram-negative and acid-fast bacteria. It is remarkably active against staphylococci, the activity being about 30 times greater than novobiocin. It shows, however, reduced activity against a laboratory strain of staphylococcus which was made resistant to novobiocin. Two strains of lactobacilli tested, which are sensitive to novobiocin, were found to be resistant to notomycin $A_1$.

Effect of inoculum size on the minimum inhibitory concentration

The test was done using Staphylococcus aureus 209P as the test organism and heart infusion broth as the medium. Six levels of inocula, $5 \times 10^6$, $5 \times 10^5$, $5 \times 10^4$, $5 \times 10^3$, $5 \times 10^2$, and 50 cell/ml. were used and the MIC was determined by two-fold serial tube dilution method, adjusting the initial pH of the test medium to 7.0. It was found that heavy inocula of more than $10^6$ cell/ml. increase the MIC value of notomycin $A_1$ and a similar effect was observed with novobiocin.

Effect of media pH on the minimum inhibitory concentration

The MIC of notomycin $A_1$ was tested by broth dilution method, the pH of the media being controlled by M/10 phosphate buffer in heart infusion broth. A $10^4$ dilution of an overnight culture of Staphylococcus aureus 209P ($5 \times 10^4$ cell/ml.) was inoculated into each tube. It was found that the activity of notomycin increases in acidic pH and decreases in alkaline pH. The comparative data with novobiocin indicate that notomycin $A_1$ is affected by media pH to a greater extent than novobiocin.

Effect of serum on the minimum inhibitory concentration

Increasing concentrations of human serum were added to heart infusion broth containing phosphate buffer in a final concentration of M/10 to maintain the medium pH at 7.0. Staphylococcus aureus 209P was used as a test organism, the inoculum size being $5 \times 10^4$ cell/ml. It was found that the MIC of notomycin $A_1$ and novobiocin was markedly affected by serum.

Activity of notomycin against clinically isolated staphylococci

A variety of *Staphylococcus aureus* cultures (126 strains) isolated from clinical sources were tested in vitro against notomycin along with six commercial antibiotics: namely, benzylpenicillin, dihydrostreptomycin, tetracycline, erythromycin, kanamycin, and novobiocin. The MIC values were obtained by ten-fold serial agar dilution method and the material used was a notomycin complex containing approximately 70% of notomycin $A_1$.

The results indicate that notomycin is highly active against staphylococci and is not cross-resistant with other antibiotics. Only one strain out of 126 strains was found to be resistant to novobiocin. This strain was also found to be more resistant to notomycin.

In vivo experiments on notomycin $A_1$.— Toxicologic studies

Notocycin $A_1$ is an antibiotic of low toxicity. The acute subcutaneous $LD_{50}$ in mice was 380 mg./kg. No death occurred by oral administration of 2000 mg./kg. in the same species. Chronic toxicity was examined in a group of ten rats which received intramuscularly 25 mg./kg./day or orally 100 mg./kg./day of the antibiotic daily for 60 days (6 day/week basis). In this experiment, novobiocin was used as a reference and saline was given to control groups. The weight gain was normal and no adverse effect was observed during the treatment period.

Chemotherapeutic effect on mice

The in vivo activity of notomycin $A_1$ as tested on mice against an experimental infection of *Staphylococcus aureus*, Smith strain. The material used was the free acid form of the antibiotic, dissolved in dioxane and diluted to the appropriate concentrations with sterile water. Mice were infected intraperitoneally with $100 \times LD_{50}$ of the pathogen and the antibiotic was administered subcutaneously or orally just after the bacterial challenge. The log-probit method of Litchfield and Wilcoxon in J. Pharmacol. Exp. Therap. 96(2): 99–113, (1949) was used for the calculation of median curative dose ($CD_{50}$). A subcutaneous $CD_{50}$ of 0.13 mg./kg. and an oral $CD_{50}$ of 4.3 mg./kg. were obtained. In a comparative test, subcutaneous and oral $CD_{50}$ values of novobiocin were found to be 3.0 mg./kg. and 7.6 mg./kg., respectively.

Notomycin $A_2$

*Streptomyces rishiriensis* was fermented 171 hours with agitation and aeration at 83° F. in a medium containing the following ingredients: 7.0% starch ("Staclipse J"); 3.0% cottonseed endosperm flour ("Pharmamedia"); 1.5% debittered yeast; 0.5% $CaCO_3$; 0.4% $K_2HPO_4$ and 0.01% "Pluronic L61." The notomycin complex so produced contained a large proportion of notomycin $A_2$ and was isolated as a solid by solvent extraction (MIBK).

Three hundred grams of the above material were converted to sodium notomycin $A_2$ by the procedure of the preceding example after removing the 17% of starting material which was insoluble in tetrahydrofuran. The product was recrystallized by dissolving in 15 ml. (per gram of solid) of a solution of equal parts of methylene chloride and methanol by warming to boiling, stirring vigorously, filtering, boiling off some methylene chloride, adding methanol to a haze point and cooling slowly to allow crystals to form.

The product was then purified by Craig counter-current distribution using 40 ml. of aqueous phase and 20 ml. of solvent upper phase in a 200-tube apparatus. The solvent system used was 15 liters of 0.25 molar triethylamine in water mixed with 30 liters methyl ethyl ketone and adjusted to pH 8.0 with glacial acetic acid. Twenty grams of product were put into 16 tubes and 700 transfers were made. In two runs the notomycin $A_2$ found in tubes 105–129 was combined (9.0 g.) put into the first eight tubes of the Craig apparatus using the same solvent system and, after 700 transfers, collected from tubes 115–134 (2.5 g.), converted to the free acid and reconverted to 1.145 g. crystalline sodium salt of notomycin $A_2$ for which the following analytical results were obtained:

|  | Theory, percent | Found, percent |  | Average, percent |
|---|---|---|---|---|
| C | 57.6 | 57.75 | 57.40 | 57.58 |
| H | 4.94 | 4.54 | 4.72 | 4.63 |
| N | 6.34 | 5.62 | 6.18 | 5.90 |
|  |  | (5.82 cor.) | (6.41 cor.) | (6.13) |
| Ash | (Na 2.08) | 3.5 | 3.00 | 3.25 |
| Percent Volatile |  | 4.15 | 3.9 | 4.0 |

When pelleted in potassium bromide this sample of notomycin $A_2$ exhibited infrared absorption maxima at the following wave numbers in reciprocal centimeters: 3380, 2980, 2940, 1695, 1638, 1604, 1535, 1413, 1315, 1265, 1160, 1120, 1090, 1030, 995, 973, 950, 885, 820, 765, 750. The bands at 1413 and 950 cm.$^{-1}$ are present in notomycin $A_2$ but not in notomycin $A_1$.

Notomycin $A_2$ has the structural formula

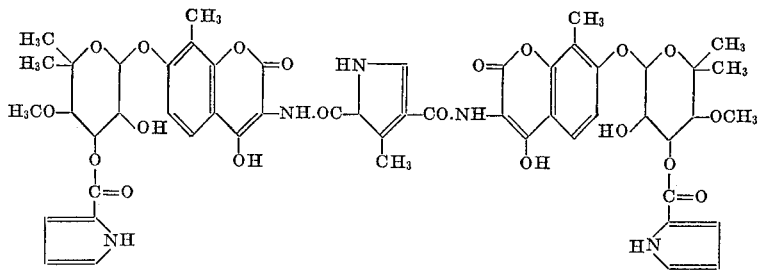

The antibacterial spectrum in vitro of the sample of notomycin $A_2$ prepared above was tested by the tube dilution technique to determine the minimum concentrations (MIC) of the antibiotic completely inhibiting growth of bacteria for 24 hours. The following results were obtained:

|  | Medium* | MIC in mcg./ml. | |
|---|---|---|---|
|  |  | 1st Run | 2nd Run |
| *Bacillus subtilis* | HIB | 12.5 | 12.5 |
| *Escherichia coli* | HIB | >100 | >100 |
| *Klebsiella pneumoniae* | HIB | 12.5 | 12.5 |
| *Proteus morganii* | HIB | 25 | 25 |
| *Proteus vulgaris* | HIB | >100 | >100 |
| *Pseudomonas aeruginosa* 8602/A | HIB | >100 | >100 |
| *Pseudomonas aeruginosa* (Yale) | HIB | >100 | >100 |
| *Salmonella enteritidis* | HIB | >100 | >100 |
| *Salmonella typhosa* | HIB | 50 | >100 |
| *Staphylococcus aureus* (Smith) | HIB | >100 | >100 |
| *Staphylococcus aureus* (Smith) | HIB+S | 0.25 | >1 |
| *Streptococcus pyogenes* | HIB | 50 | 50 |
| *Proteus vulgaris* No. 329 | HIB | 0.5 | 0.5 |
|  |  |  | >100 |

*HIB—Difco Heart Infusion broth. HIB+S—Same mixed 1:1 with pooled human serum.

We claim:
1. In the process for the production of notomycin $A_1$ by submerged aerobic fermentation *Streptomyces, rishiriensis*, the step which comprises adding a source of ionic cobalt in an amount of at least 0.02 part but less than 400 parts per million parts of medium early in the fermentation to produce at harvest a broth containing a major amount of notomycin $A_1$ and a minor to negligible amount of notomycin $A_2$.

2. In the process for the production of notomycin $A_1$ by submerged aerobic fermentation of *Streptomyces rishiriensis*, the step which comprises adding a source of ionic cobalt in an amount in the range of about 0.02 to about 200 parts per million parts of medium early in the fermentation to produce at harvest a broth containing a major amount of notomycin $A_1$ and a minor to negligible amount of notomycin $A_2$.

3. In the process for the production of notomycin $A_1$ by submerged aerobic fermentation of *Streptomyces rishiriensis*, the step which comprises adding a cobalt salt in the amount of at least 0.02 part but less than 400 parts per million parts of medium early in the fermentation to produce at harvest a broth containing a major amount of notomycin $A_1$ and a minor to negligible amount of notomycin $A_2$.

References Cited

UNITED STATES PATENTS 3,201,386  8/1965  Kawaguchi et al. ____ 260—210

MAURICE W. GREENSTEIN, *Primary Examiner.*